(12) United States Patent
Kuo

(10) Patent No.: US 6,216,322 B1
(45) Date of Patent: Apr. 17, 2001

(54) HOOK DEVICE FOR LUGGAGE

(75) Inventor: Chung-Hsie Kuo, Pan-Chiao (TW)

(73) Assignee: Chaw Khong Technology Co., Ltd., Taipei (TW)

( * ) Notice: Subject to any disclaimer, the term of this patent is extended or adjusted under 35 U.S.C. 154(b) by 0 days.

(21) Appl. No.: 09/407,078

(22) Filed: Sep. 28, 1999

(51) Int. Cl.⁷ .................................................. F16B 45/02
(52) U.S. Cl. ................................... 24/599.9; 109/102
(58) Field of Search ............................ 24/599.9, 599.5, 24/601.1; 248/309.1; D8/367; 190/102, 108; 294/82.19

(56) References Cited

U.S. PATENT DOCUMENTS

| | | | |
|---|---|---|---|
| 316,269 | * 4/1885 | Jewett . | |
| 548,694 | * 10/1895 | Breul . | |
| 1,356,830 | * 10/1920 | Rohrbach . | |
| 5,311,972 | 5/1994 | Plath | 190/102 |
| 5,517,735 | * 5/1996 | Tsai . | |
| 5,593,009 | 1/1997 | King | 190/102 |
| 5,842,673 | 12/1998 | Fenton | 248/309.1 |

* cited by examiner

*Primary Examiner*—James R. Brittain
(74) *Attorney, Agent, or Firm*—Dougherty & Troxell

(57) ABSTRACT

A hook device attached to main luggage for securing auxiliary luggage thereto comprises a body including an opening, a pair of holes each provided at an inner side of the opening, a curved portion, and a hook end having a recess; and a hinged member engaged to the pair of holes having a pair of claws projected from a bottom end. The hinged member is detachably secured to the hooking body when the claws are caught in the recess, and the hinged member is disengaged from the body when the claws clear the recess. Thus the easy accessibility and the looking security for luggage hook device are readily accomplished.

2 Claims, 4 Drawing Sheets

US 6,216,322 B1

HOOK DEVICE FOR LUGGAGE

FIELD OF THE INVENTION

The present invention relates to a hook device for luggage, and more particularly to a hook device for securing a luggage to another luggage.

BACKGROUND OF THE INVENTION

Typically, a hanging hook or a strap buckle is used for hooking a second luggage to a first luggage. It is known a large second luggage is not suitable to be hooked to first luggage by the hanging hook due to the size of the hook. Further, the large second luggage is prone to separate from the first luggage during transport even when the large second luggage is securely hooked to the first luggage by the hanging hook.

Strap buckle is suitable to any size or type of luggage. It is required to use a strap to wrap the second luggage around prior to buckling it to the first luggage. It is seen that it is not convenient to use. Further, it is an annoying thing to stow in the relatively long strap for storing when not in use. Otherwise, the strap will hinder the operation of luggage.

Further, various designs for attaching an auxiliary luggage to a main luggage have located in a search as follow:

U.S. Pat. No. 5,311,972 discloses a luggage with attachable components but this is unsatisfactory due to the attached luggage may fall from the hook member inadvertently, as mentioned above.

U.S. Pat. No. 5,842,673 discloses a luggage hook strap but it is unsatisfactory to have the member 4 easily and quickly detachably fastened to or unfastened from the rigid hook due to the flexibility of member 4. It means that it is susceptible to squeeze in the accessibility to the slot of the rigid hook and thus inconvenient for use during the journey.

U.S. Pat. No. 5,593,009 discloses a retractable auxiliary luggage attachment mechanism and method but it is unsatisfactory due to its complex mechanism, for example, the hook and strap having one end fixed within the pocket are received in the pocket and closed with a cover when not in use and pulled out from the opened pocket when in use, and thus very inconvenient in view of this, and the pocket consumes a useable packing space within the luggage case.

SUMMARY OF THE INVENTION

In view of the foregoing, it is therefore an object of the present invention to provide a hook device for luggage for hooking a luggage of any size to another luggage wherein a second luggage is attached to a first luggage, and then a pivoted locking member is clung to a hooking body for securing second luggage to first luggage, thereby preventing second luggage disengaging from first luggage during ground transportation.

It is another object of the present invention to provide a hook device for luggage wherein one end of pivoted locking member is pivotably attached to a pair of holes on top of a curved portion of hooking body, and the other end of pivoted locking member is clung to top of hooking body in a locking position.

It is further object of the present invention to provide a hook device for luggage wherein pivoted locking member is a component of hooking body of first luggage in an unlocked position, and is capable of inserting into a gap between handle and luggage case of other luggage for hooking it to the first luggage. As such, a wide usage is made possible.

The above and other objects, features and advantages of the present invention will become apparent from the following detailed description taken with the accompanying drawings.

DETAILED DESCRIPTION OF PREFERRED EMBODIMENTS

Figure 1:
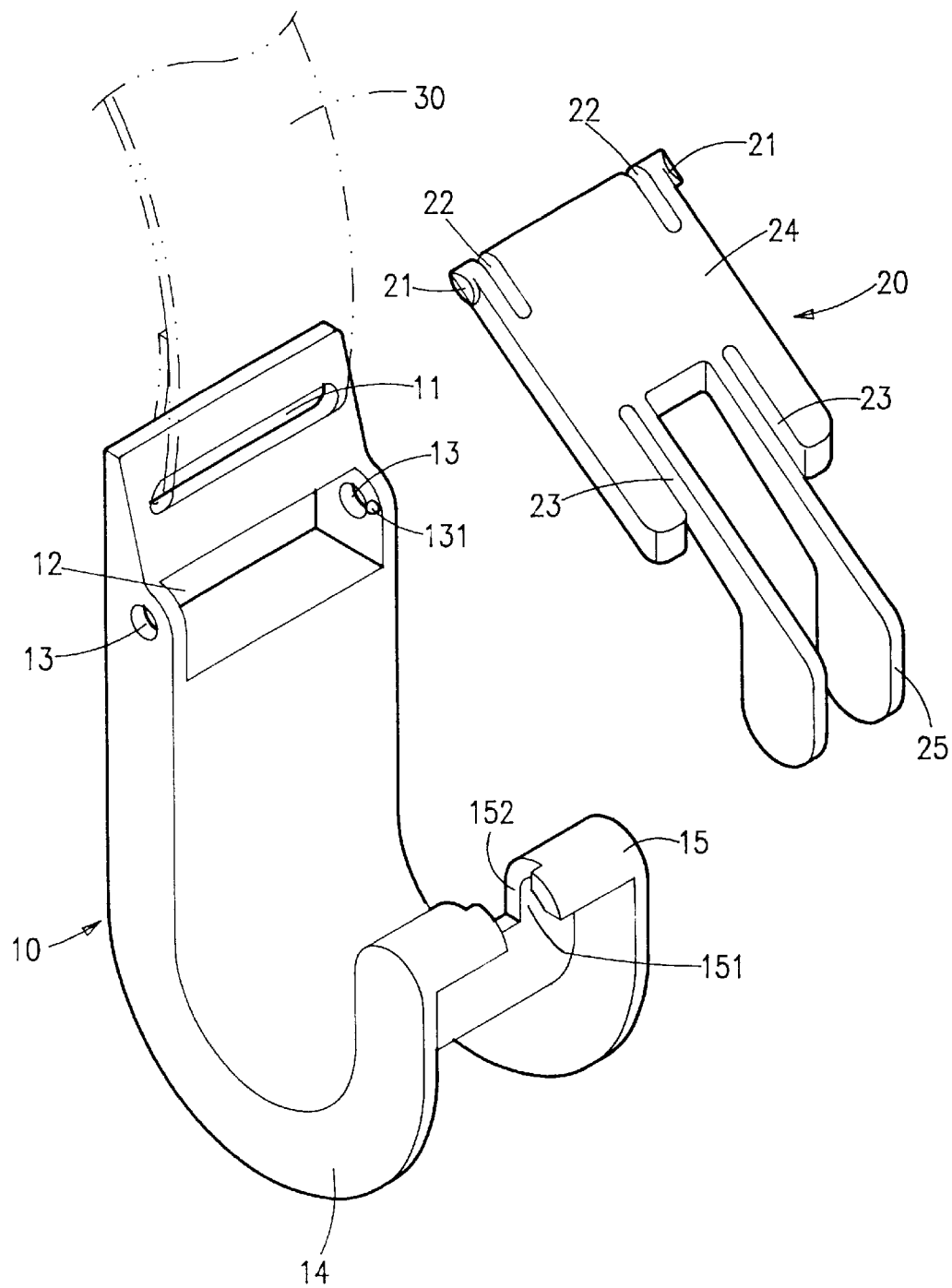
FIG. 1 is an exploded perspective view of a hook device for luggage according to a preferred embodiment of the present invention.
Figure 2:
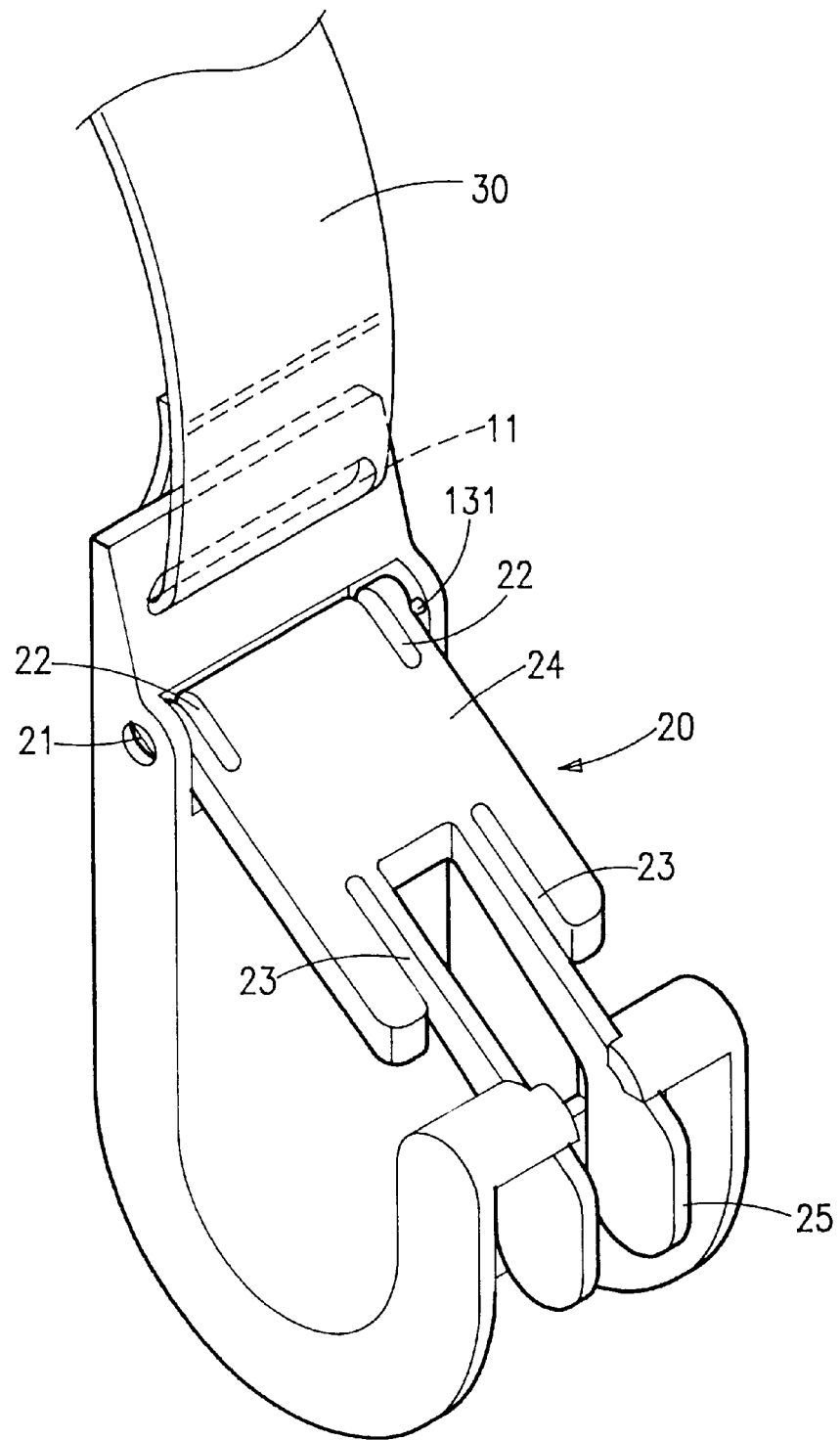
FIG. 2 is a perspective view of FIG. 1 showing hook device is attached to a strap in a locked position.

Referring to FIGS. 1–4, there is shown a hook device for luggage of the present invention comprising a hooking body 10 and a pivoted locking member 20 wherein the hooking body 10 includes a transverse elongated slot 11 at an upper portion thereof for allowing a strap 30 to pass through to fasten thereto, an elongated through opening 12 provided under the transverse elongated slot 11, having a pair of holes 13 each with a stopper 131 provided at an inner side of the opening 12, a curved portion 14, and a hook end 15, having a relatively narrower groove 151 and a relatively wider groove 152 communicated with each other provided at the middle portion of the hook end 15; and the pivoted locking member 20 includes a body 24, extending from the upper end side portions thereof, a pair of pivoted projections 21 capable of being inserted into the pair of holes 13 of the hooking body 10 for allowing pivoted locking member 20 to pivot about an imaginary axis, a pair of grooves 22 each provided adjacent to a corresponding projection 21 providing a cushion space for the projection 21, a pair of opposite longitudinal downward claws 25 provided at the lower ends of the body 24, and a pair of opposed longitudinal grooves 23 located between the side portion of the body 24 and the upper end of the longitudinal downward claws 25 for providing a preferable cushion space for the claws 25.

In operation, insert the curved portion 14 of the hooking body 10 into a gap between handle and luggage case of a second luggage for securing to a first luggage, and then cling claws 25 of pivoted locking member 20 to the relatively narrower groove 151 and then push it down to the relatively wider groove 152 of hooking body 10 to secure and lock the claw 25 into the relatively wider groove 152 due to the flexibility of the elastic function of claws 25 to be expanded thereto for securing second luggage to first luggage, thereby preventing second luggage disengaging from first luggage during transportation.

Figure 3:
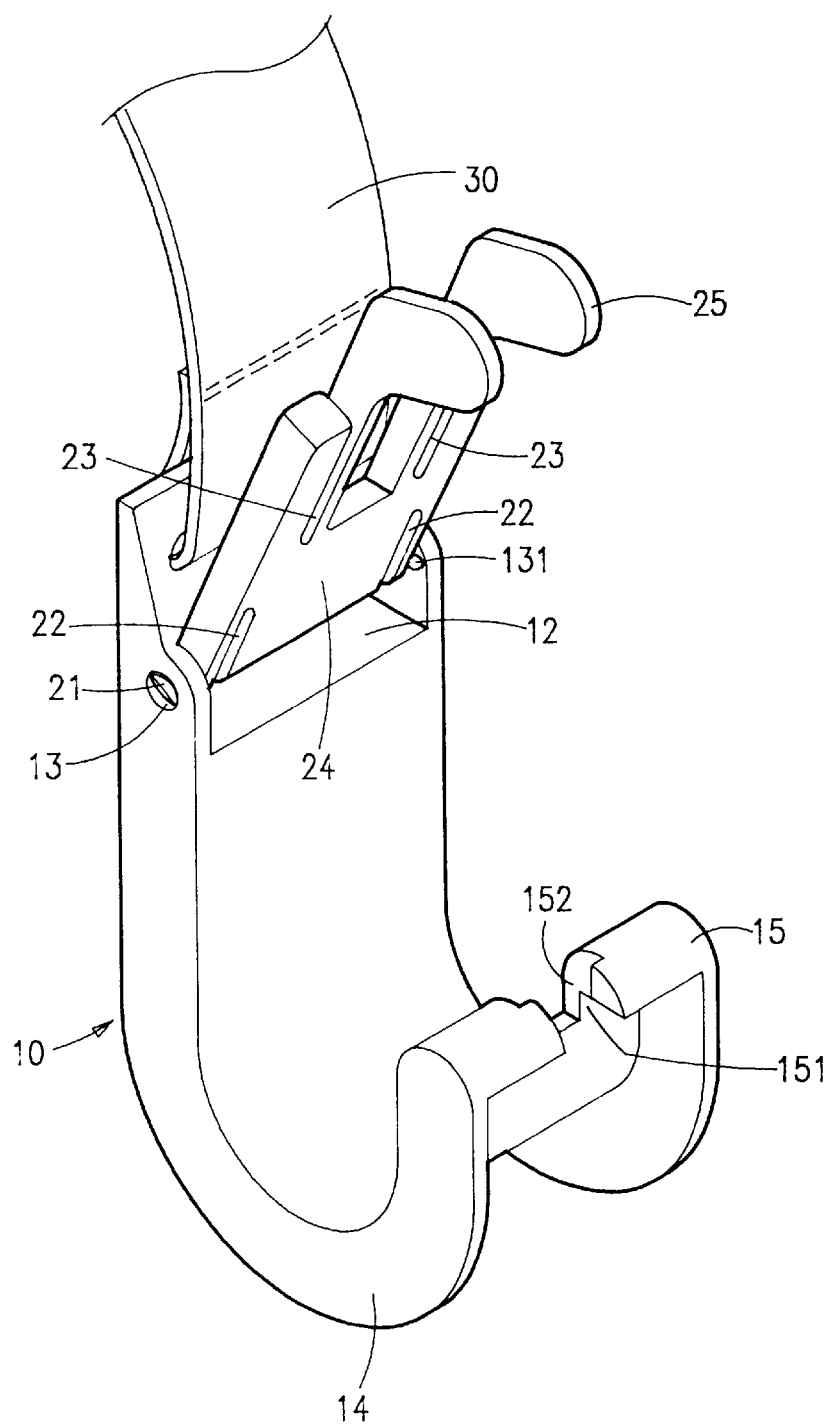
FIG. 3 is an unlocked position of the present invention shown in FIG. 2.
Figure 4:
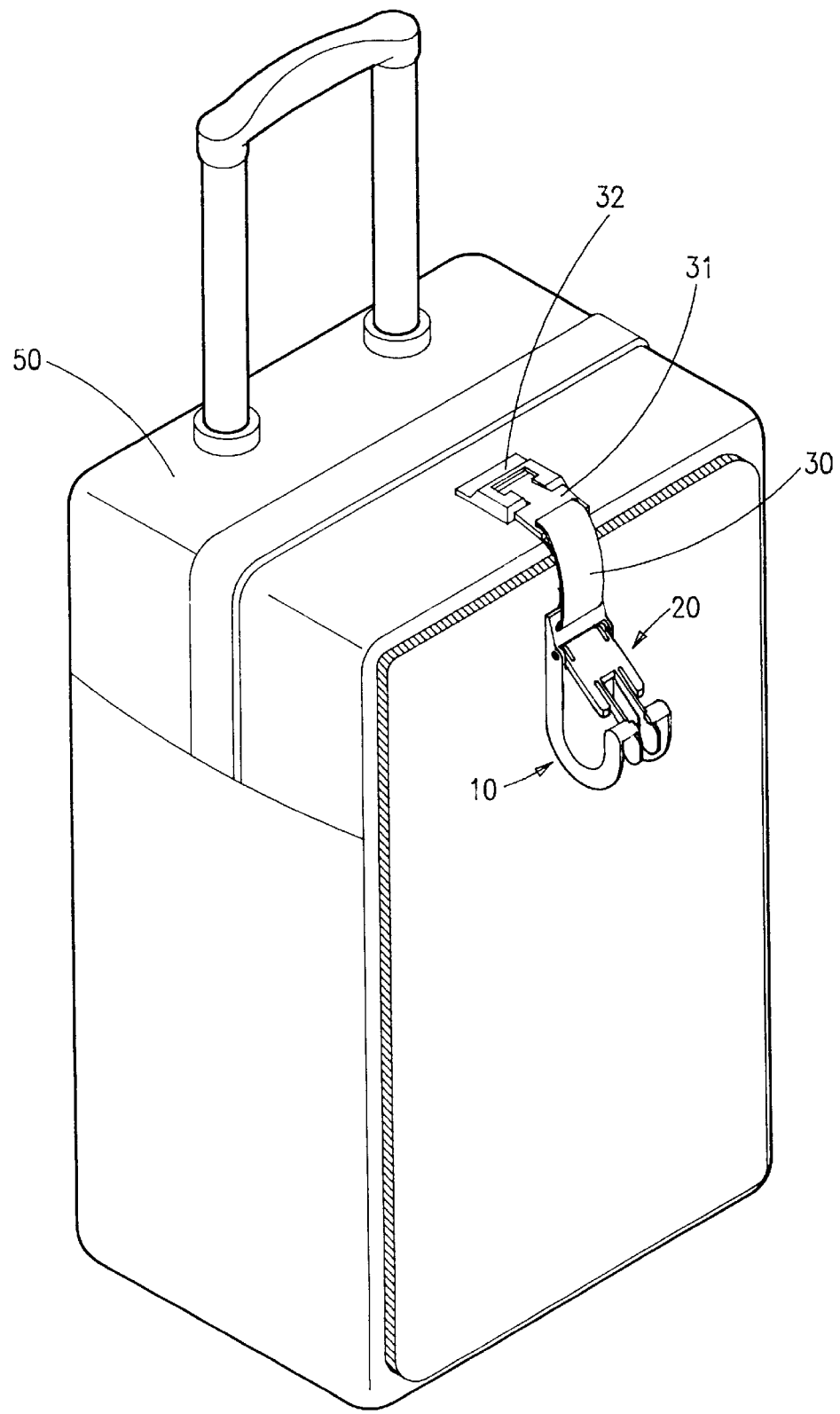
FIG. 4 is perspective view of the present invention installed in a luggage.

When disengaged, it is only required to press two end portions of the claw 25 toward inwardly each other to disengage claws 25 from the relatively wider groove 152 of the hooking body 10 for disengaging the pivoted locking member 20 from hooking body 10 and then turning the pivoted locking member 20 in a counterclockwise direction and stop by the raised stopper 131 ready for next use, as shown in FIG. 3.

While the invention herein disclosed has been described by means of specific embodiments, numerous modifications and variations could be made thereto by those skilled in the art without departing from the scope of the invention set forth in the claims.

What is claimed is:

1. A hook device for securing a first luggage to a second luggage, comprising:
   a strap;
   a hooking body including a transverse elongated slot adjacent a top end for attaching to the strap, an elongated opening under the slot, a pair of holes each provided at an inner side of the opening, a curved portion, a hook end having a portion cut out to form an upper narrowed cavity and a lower wider cavity being communicated with the upper narrowed cavity; and
   a flexible hinged member including a pair of projections on a top portion of two opposite sides capable of being inserted into and pivoting about the holes, a pair of first grooves each adjacent one of the projections for providing a first cushion space, and a pair of claws projected from a bottom end, and a pair of second grooves each provided between one side of the hinged member and one of the claws for providing a second cushion space;
   wherein the hinged member is detachably secured to the hooking body when the claws are caught in the lower wider cavity by pressing through the upper narrowed cavity, and the hinged member is disengaged from the hooking body by pressing the claws toward each other and pulling up to pass through the upper narrowed cavity.

2. The hook device of claim 1, further comprising a pair of raised stopper each adjacent to each of the holes for holding the displaced hinged member.

* * * * *